Oct. 14, 1958 — T. RASMUSSON — 2,855,694
PRECISION CENTER PUNCH TOOL
Filed Aug. 24, 1956 — 2 Sheets-Sheet 1

Theodore Rasmusson
INVENTOR.

Oct. 14, 1958 T. RASMUSSON 2,855,694
PRECISION CENTER PUNCH TOOL
Filed Aug. 24, 1956 2 Sheets-Sheet 2
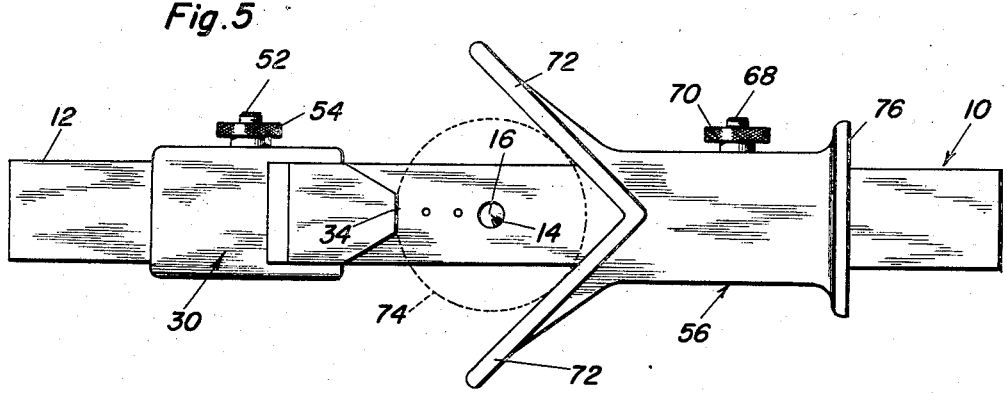
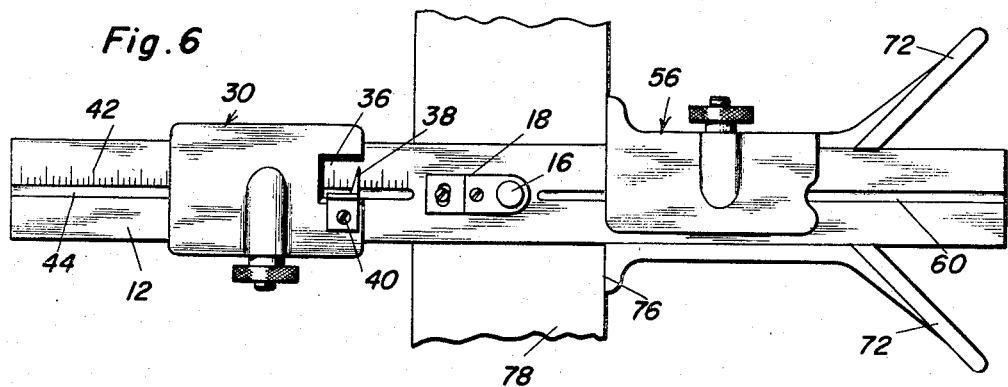
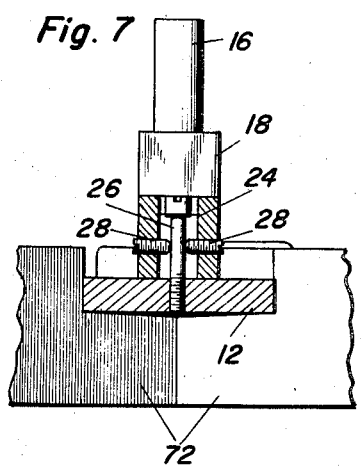
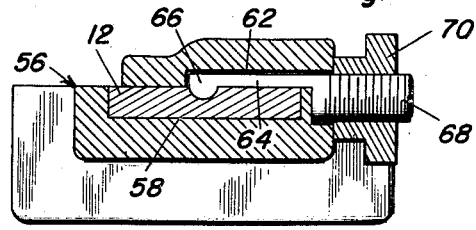
Theodore Rasmusson
INVENTOR.

United States Patent Office 2,855,694
Patented Oct. 14, 1958

2,855,694

PRECISION CENTER PUNCH TOOL

Theodore Rasmusson, Santa Monica, Calif.

Application August 24, 1956, Serial No. 606,012

2 Claims. (Cl. 33—191)

While there have been developed in the past various types of centering punch tools which are provided with scales whereby once the known diameter or transverse dimension of a workpiece is known, the scale of the centering punch tool may be set so as to position a center punch in the center of the workpiece. However, such center punch tools rely upon the proper engagement of the tool with the workpiece to be punched by a manual operation with the user of the tool holding the tool on the workpiece during the punching operation. This permits a possible slippage of the tool with respect to the workpiece at the time the centering punch is being driven into the workpiece to form the center hole.

It is therefore the primary object of this invention to provide a center punch tool which is so constructed whereby it may be accurately positioned on an end of a workpiece and may be clamped to such workpiece so as to retain it in the desired position in such a manner to prevent shifting of the centering punch tool with respect to the workpiece at the time the centering punch is being used to form the necessary punch mark in the workpiece.

Another object of this invention is to provide a precision center punch tool which includes a support for carrying a center punch holder, there being mounted on the support bar a first carriage which is adjustable relative to a center punch holder and which is provided with means for positioning the same relative to the center punch holder, the first carriage being provided with a suitable stop whereby the center punch holder may be accurately positioned with respect to a workpiece, the tool also including a second carriage slidably mounted on the bar and having clamp means for engaging the workpiece opposite from the stop so that the workpiece is securely clamped between the stop and the clamp to prevent shifting of the tool relative to the workpiece at the time the center punch of the tool is being used.

A further object of this invention is to provide an improved center punch tool which includes a bar having means thereon for positioning the bar relative to a workpiece, there being carried by the bar a center punch holder, a center punch holder being provided with adjustment means to assure the proper centering of a center punch carried thereby with respect to the bar.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 5 is a bottom plan view of the center punch tool the round bar stock being shown in doted lines;

Figure 6 is a plan view of the center punch tool and shows it in use in conjunction with rectangular stock, the tool being selectively used for either punching the stock along the center line thereof or for sliding movement therealong to scribe a center line on the stock;

Figure 1:
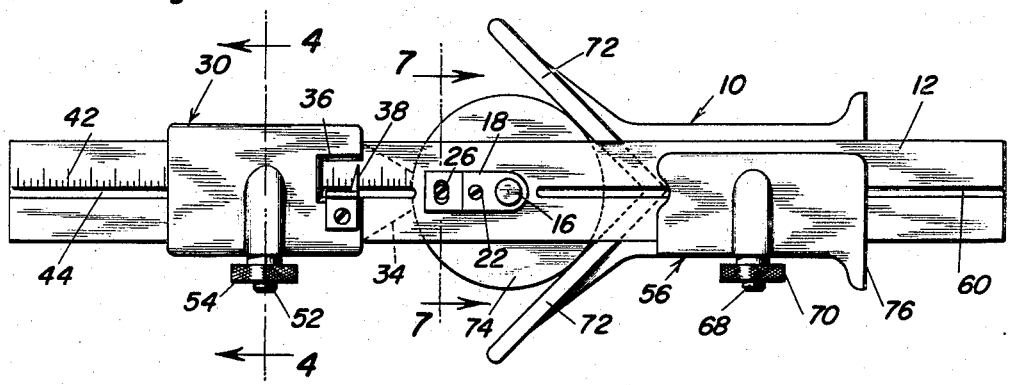
Figure 1 is a plan view of the precision center punch tool which is the subject of this invention and shows the same mounted on a round bar stock for the purpose of punching a center in one end thereof.
Figure 2:
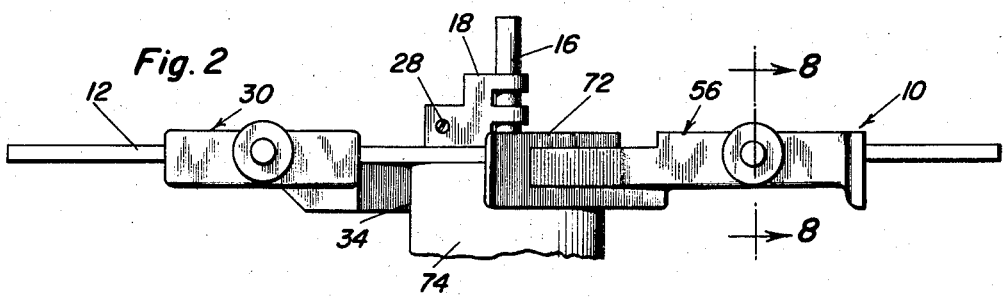
Figure 2 is a side elevational view of the precision center punch tool.
Figure 3:
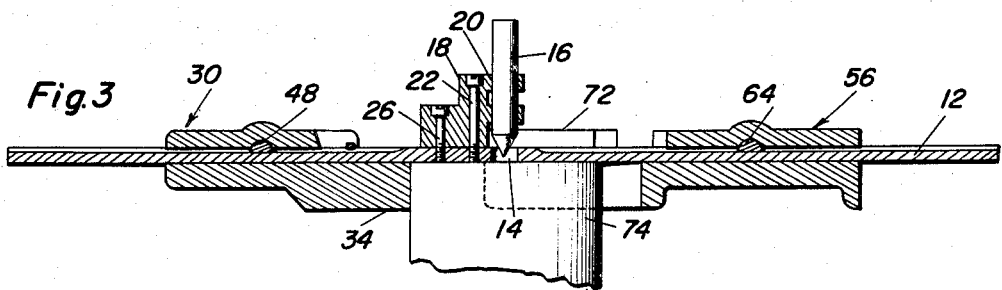
Figure 3 is a longitudinal vertical sectional view taken through the center punch tool and shows the relationship of the various components thereof including the relationship of a center punch holder, a center punch carried by the holder and a support bar of the tool.

Figure 7 is an enlarged fragmentary vertical sectional view taken substantially upon the plane indicated by the section line 7—7 of Figure 1 and shows the manner in which the center punch holder is adjusted relative to the support bar; and Figure 8 is an enlarged transverse vertical sectional view taken substantially upon a plane indicated by section line 8—8 of Figure 2 and shows the means for clamping the second carriage in an adjusted position on the support bar.

Referring now to the drawings in detail, it will be seen that there is illustrated the precision center punch tool which is the subject of this invention, the center punch tool being referred to in general by the reference numeral 10. The center punch tool 10 includes an elongated support bar 12 which is formed of rectangular stock. Disposed in the central part of the support bar 12 is an opening 14. The opening 14 is intended to have a center punch, such as the center punch 16 passed therethrough. Carried by the central part of the support bar 12 on the upper side thereof is a center punch holder 18 which is provided with a vertical bore 20 which is aligned with the opening 14. Slidably mounted within the vertical bore 20 is the center punch 16.

The center punch holder 18 is clamped to the upper surface of the support bar 12 by a centrally located fastener 22 which also serves to pivotally mount the center punch holder 18 on its support bar 12.

Referring now to Figure 7 in particular, it will be seen that the rear part of the center punch holder 18 is provided with an enlarged bore 24 in which there is loosely positioned a second fastener 26, the fastener 26 being carried by the support bar 12. Carried by the center punch holder 18 is a pair of opposed setscrews 28 which extend into the opening 24. The setscrews 28 engage opposite sides of the fastener 26 and serve to position the center punch holder 18 relative to the fastener 26 and the support bar 12. By adjusting the setscrews 28, the center punch 16 may be aligned with the exact center of the opening 14.

Slidably mounted on the support bar 12 to one side of the center punch holder 18 is a first carriage which is referred to in general by the reference numeral 30. The carriage 30 is provided with a generally rectangular cross sectional opening 32 in which the support bar 12 is snugly received. Formed integral with the underside of the carriage 30 is a projecting workpiece stop 34. The upper side of the carriage is recessed as at 36 and has secured thereto a suitable pointer 38 by means of a fastener 40.

The upper surface of the support bar is provided with a scale 42 which is suitably graduated with respect to the center of the opening 14. The scale 42 takes into consideration the workpiece engaging stop 34 with respect to the pointer 38. The scale 42 will be graduated in inches corresponding to the diameter of round stock or to the transverse dimension of the flat stock. It is to be understood that the reading on the scale 42 will be twice the distance between the workpiece engaging stop 34 and the center of the opening 14.

Figure 4:
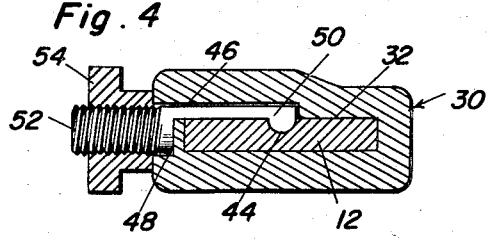
Figure 4 is an enlarged transverse vertical sectional view taken substantially upon the plane indicated by the section line 4—4 of Figure 1 and shows the means for clamping a first carriage of the tool in an adjusted position on the support bar thereof.

In order that the first carriage 30 may be clamped in an adjusted position on the support bar 12, the upper surface of the support bar 12 is provided with an elongated groove 44. As is best illustrated in Figure 4, the carriage 30 is provided with a transverse opening 46 in which there is disposed a transversely extending arm 48. The arm 48 is provided at the inner end thereof with an anchor 50 which is seated in the groove 44 and slidable longitudinally thereof. The arm 48 includes an externally threaded outer portion 52 which has threaded engaged thereon a clamping nut 54 which abuts against the side edge of a carriage 30. By tightening down on the nut 54, the arm 48 is tensioned so as to wedge or cam the carriage 30 relative to the support bar 12 to prevent relative movement between the two.

It is to be understood that the carriage 30 and the work-piece engaging stop 34 carried thereby will be sufficient to position the tool 10 relative to a workpiece to be center punched. However, such a construction would require the operator or user thereof to hold the workpiece engaging stop 34 against the workpiece during the punching operation. Inasmuch as this is difficult to do, it will be readily apparent that the tool 10 could shift relative to the workpiece and thereby result in the centering opening formed by the center punch being off-center. In order to prevent this, there is provided a second carriage which is referred to in general by the reference numeral 56. The carriage 56 is very similar in construction to the carriage 30 and includes a generally rectangular opening 58 in which the support bar 12 is slidably received. The support bar 12 is provided with a second longitudinal groove 60 which is similar to the groove 44. The carriage 56 is provided with a transverse opening 62 in which there is mounted a transversely extending arm 64. The inner end of the arm 64 is provided with an anchor 66 seated in the groove 60. The outer end of the arm 64 is externally threaded as at 68 and has engaged thereon a clamping nut 70. The nut 70 serves to shift the carriage 58 transversely with respect to the support bar 12 to retain the carriage 56 in an adjusted position on the support bar 12.

The carriage 56 is provided at one end thereof with diverging workpiece engaging clamping flanges 72, as is best illustrated in Figure 5. The flanges 72 are so arranged whereby they may firmly grip round stock, such as the workpiece 74. The opposite end of the carriage 56 is provided with a workpiece clamping surface 76 which is square cut. The workpiece clamping surface 76 is suitable for engaging rectangular stock, such as the workpiece 78.

Once the workpiece engaging stop 34 has been properly positioned on the support bar 12, it is merely necessary to slide the carriage 56 toward the opening 14 so that the flanges 72 engage the workpiece 74 opposite from the workpiece engaging stop 34. Thus the tool 10 is clamped onto the end of the workpiece 74. Since the tool 10 cannot move relative to the workpiece 74 due to the clamping action effected by the carriages 30 and 56, shifting of the tool 10 with respect to the workpiece 74 is prevented. Therefore, when the center punch 16 is tapped to provide the centering hole in the workpiece 74, the centering hole will be accurately positioned.

When the tool 10 is mounted on a rectangular bar stock workpiece, such as the workpiece 78, a center mark may be placed on the workpiece 78 at any desired point. If desired, a plurality of such center marks may be placed upon the workpiece 78 and then a center line drawn by using a straight edge and a scriber. On the other hand, by loosening the carriage 56 only slightly, and by using a scriber similar to the center punch 16, the tool 10 could be shifted longitudinally of the workpiece 78 and be used to scribe a center line thereon.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A precision center punch tool comprising an elongated support bar, said bar having an opening therethrough, a center punch holder aligned with said opening, a first carriage slidably mounted on said bar on one side of said center punch holder for movement along said bar between an adjacent end of said bar and said center punch holder, a workpiece positioning stop carried by said first carriage, a scale on said bar, a pointer on said first carriage cooperating with said scale to position said stop relative to said center punch holder, and a second carriage slidably mounted on said bar on the opposite side of said center punch holder for movement along said bar between an adjacent end of said bar and said center punch holder, a workpiece engaging member carried by said second carriage in opposed relation to said stop, and cooperating with said stop to form a workpiece clamp, said center punch holder having a center punch receiving bore, a first fastener mounting said center punch holder on said bar for pivotal movement about an axis parallel to the axis of said bore to align said bore with said opening, and a second fastener locking said center punch holder in an adjusted position on said bar.

2. A precision center punch tool comprising an elongated support bar, said bar having an opening therethrough, a center punch holder aligned with said opening, a first carriage slidably mounted on said bar on one side of said center punch holder for movement along said bar between an adjacent end of said bar and said center punch holder, a workpiece positioning stop carried by said first carriage, a scale on said bar, a pointer on said first carriage cooperating with said scale to position said stop relative to said center punch holder, and a second carriage slidably mounted on said bar on the opposite side of said center punch holder for movement along said bar between an adjacent end of said bar and said center punch holder, a workpiece engaging member carried by said second carriage in opposed relation to said stop and cooperating with said stop to form a workpiece clamp, said center punch holder having a center punch receiving bore, a first fastener mounting said center punch holder on said bar for pivotal movement about an axis parallel to the axis of said bore to align said bore with said opening, and a second fastener releasably locking said center punch holder in an adjusted position on said bar, said center punch holder including adjusting screws disposed normal to said second fastener and engaging said second fastener at diametrically opposite sides thereof for adjusting said center punch holder relative to said bar.

References Cited in the file of this patent

UNITED STATES PATENTS

| | | |
|---|---|---|
| 229,283 | Starrett | June 29, 1880 |
| 539,688 | Kolb | May 21, 1895 |
| 787,893 | Christoph | Apr. 25, 1905 |
| 1,373,367 | Summers | Mar. 29, 1921 |
| 1,508,175 | Fontaine | Sept. 9, 1924 |
| 2,356,525 | Maness | Aug. 22, 1944 |
| 2,536,378 | Lee | Jan. 2, 1951 |
| 2,567,338 | Jock | Sept. 11, 1951 |
| 2,599,819 | Fisher | June 10, 1952 |
| 2,758,381 | Benkoe | Aug. 14, 1956 |